United States Patent [19]

Ohtsuki et al.

[11] Patent Number: 4,708,909
[45] Date of Patent: Nov. 24, 1987

[54] RADIATION-CURABLE, MAGNETIC COATING MATERIAL AND MAGNETIC RECORDING MEDIUM USING THE SAME

[75] Inventors: Akira Ohtsuki; Ryozo Konno; Nobumori Kanno; Makio Sugai; Takashi Mihoya; Yuichi Kubota; Masaharu Nishimatsu; Yukihiro Isobe; Kazushi Tanaka; Osamu Shinoura, all of Tokyo, Japan

[73] Assignee: Toyo Ink Mfg. Co., Ltd., Tokyo, Japan

[21] Appl. No.: 933,268

[22] PCT Filed: Jul. 22, 1982

[86] PCT No.: PCT/JP82/00284

§ 371 Date: Feb. 28, 1983

§ 102(e) Date: Feb. 28, 1983

[87] PCT Pub. No.: WO83/00340

PCT Pub. Date: Feb. 3, 1983

Related U.S. Application Data

[63] Continuation of Ser. No. 781,200, Sep. 26, 1985, abandoned, which is a continuation of Ser. No. 480,958, Feb. 28, 1983, abandoned.

[30] Foreign Application Priority Data

Jul. 22, 1981 [JP] Japan .............................: 56-113594

[51] Int. Cl.[4] .............................................. G11B 5/702
[52] U.S. Cl. ................................. 428/425.9; 252/62.54; 427/44; 427/54.1; 427/128; 428/522; 428/694; 428/900
[58] Field of Search ...................... 428/694, 900, 425.9, 428/522; 252/62.54; 427/44, 54.1, 128, 131, 132; 360/134–136

[56] References Cited

U.S. PATENT DOCUMENTS

| | | | |
|---|---|---|---|
| 4,004,997 | 1/1977 | Tsukamoto | 428/329 |
| 4,135,036 | 1/1979 | Mukaida | 428/694 |
| 4,247,578 | 1/1981 | Skinner | 427/44 |
| 4,343,831 | 10/1982 | Tsuji | 427/44 |
| 4,368,237 | 1/1983 | Yamada | 428/900 |
| 4,368,239 | 1/1983 | Nakajima | 428/520 |
| 4,404,253 | 9/1983 | Kohler | 428/694 |
| 4,407,853 | 10/1983 | Okita | 427/44 |
| 4,415,630 | 11/1983 | Kubota | 428/457 |
| 4,448,846 | 5/1984 | Chang | 428/900 |
| 4,454,282 | 6/1984 | Bradshaw | 428/900 |
| 4,461,784 | 7/1984 | Baulmann | 427/44 |

FOREIGN PATENT DOCUMENTS 0021668  2/1981  Japan ................................. 427/44

OTHER PUBLICATIONS

S. Guruswamy, "Radiation Curing of Organic Coatings", *Metal Finishing*, Jul. 1978, pp. 25-30.

*Primary Examiner*—Ellis P. Robinson
*Attorney, Agent, or Firm*—Wyatt, Gerber, Shoup, Scobey and Badie

[57] ABSTRACT

This invention concerns a radiation-curable, magnetic coating material and a magnetic recording medium made with the coating, which is characterized in that a water-soluble or water-dispersed resin having at least one radiation-curable, unsaturated double is contained as a vehicle. The vehicle may also contain a water-soluble or water-dispersible resin, or mixtures thereof free from such an unsaturated double bond. The invention provides a magnetic recording medium with improved durability, softness, flexibility, and heat resistance.

4 Claims, 3 Drawing Figures

RADIATION-CURABLE, MAGNETIC COATING MATERIAL AND MAGNETIC RECORDING MEDIUM USING THE SAME

This application is a continuation of application Ser. No. 781,200, filed Sept. 26, 1985, now abandoned which is a continuation of application Ser. No. 480,958, filed Feb. 28, 1983, now abandoned.

This invention relates to a magnetic coating material curable upon exposure to radiation and also to a magnetic recording medium obtained by using the coating material.

Presently, varied forms of magnetic recording media, including cassette tapes, open reel tapes, magnetic cards, and magnetic disks, are made by dispersing or dissolving powdered iron oxide or suchlike magnetic substance and a binder in an organic solvent, adding to the solution a plasticizer, dispersant, antistatic agent, and/or other additives which may be desired according to the intended use, mixing and kneading the mixture, and then applying the resulting coating material on a base film of polyester, polyvinyl chloride, polyacetate, or paper.

While various thermoplastic resins are still in use, it is a more customary practice, in order to obtain greater resistance to wear and heat and improve other physical properties of the product, to use a thermosetting resin as the binder and bake (cure) the coating in an oven for many hours (e.g., at 70° C. for 2–20 hours). Besides the complexity of the process, the practice presents problems of blocking of the coating, deformation of the tape due to tightening on winding, loss of smoothness on the magnetic coating surface, and other factors adversely affecting the electrical properties of the product.

Furthermore, the magnetic coating material of the type dispersed or dissolved in an organic solvent requires such a large volume of the solvent that the process poses not only fire hazards but also environmental hygiene problems. For these reasons, the employment of aqueous resin type magnetic coating material instead has been proposed in recent years.

The aqueous resin type precludes the fire and health hazards associated with the use of the organic solvent type. The proposed method frequently uses a thermoplastic resin but more often prefers a thermosetting one and, as is the case with the organic solvent tape, the coating material applied on the substrate is baked (cured) over a long period of time in an oven so that the coating film will be more resistant to wear and heat and possess better physical properties. However, the method again offers problems, in addition to the complexity of the process, such as blocking of the coating, tape deformation due to tightening on winding, loss of smoothness on the coating surface, and other deleterious effects on the electrical properties of the product.

The present invention has been arrived at after intensive investigations made in search of an aqueous magnetic coating material adapted for use in making a magnetic recording medium which presents no such problems of the prior art but is excellent, especially in wear resistance and electrical properties. The magnetic coating material according to this invention will harden at a low temperature within a short time upon irradiation with electron beams or other radioactive rays. The material, which cures continuously as it is applied and dried, makes for improved productivity and causes no blocking due to takeup before curing nor any excessive tightening on winding. Presumably, irradiation with electron beams or the like causes a resin in the material which has at least one unsaturated double bond to produce radicals, which in turn initiate polymerization or cross-linking to form a three-dimensional network structure with good resistance to wear and heat and with other desirable physical properties. Thus, the present invention provides an excellent radiation-curable, magnetic coating material, hazardless and highly desirable from the viewpoint of environmental hygiene and which can be used in manufacturing a magnetic recording medium excellent in dimensional stability, wear resistance, surface smoothness, and other properties, within a short time in a simplified process.

In brief, the invention provides a radiation-curable, magnetic recording medium which comprises as essential components an aqueous vehicle containing of a water-soluble resin, a water-dispersible resin, or mixtures thereof each having at least one unsaturated double bond curable upon exposure to radiation, and a magnetic powder. Further, the invention provides a radiation-curable, magnetic coating material which comprises as essential components an aqueous vehicle prepared by mixing a water-soluble resin and/or a water-dispersible resin, each having at least one unsaturated double bond curable upon exposure to radiation, with a water-soluble resin and/or a water-dispersible resin, neither of which has such an unsaturated double bond, and a magnetic powder.

Although magnetic recording media consisting of a base coated with a magnetic coating material which comprises an aqueous vehicle of a thermoplastic resin, and a magnetic powder are known in the art, the resulting coats are simply dried by heating and therefore are inferior in resistance to wear and heat, etc.

For the purposes of the invention the term "radiation-curable, unsaturated double bond" is used to mean a radical-polymerizable double bond, e.g., an acrylic double bond such as of methacrylic acid or its ester, allylic double bond such as of diallyl phthalate, vinyl ether-vinyl ester type double bond, or unsaturated double bond of maleic acid or its derivative.

In short, the binder to be used in this invention is a resin with such an unsaturated double bond or bonds in its main chain, side chain, or at both ends of the molecular structure. Also, it is well-known that thermoplastic resins readily undergo a cross-linking reaction upon irradiation and that the reaction is accelerated by the presence of a resin having at least one unsaturated double bond. Thus, even a thermoplastic resin having no unsaturated double bond is caused, upon exposure to radiation, to take part in a cross-linking, curing reaction with the resin having at least one unsaturated double bond to form a three-dimensional network structure. Even when the thermoplastic resin does not form a cross-linked structure due to irradiation by a low dosage of radiation, it does form a mutually intruded structure with the three-dimensional network structure produced by the resin having at least one unsaturated double bond. It thus acts as a polymeric filler or plasticizer, which imparts proper hardness or softness and good physical properties to the magnetic recording medium.

Experiments indicated the effects of molecular weight upon the radiation-curable resins. Where high-molecular-weight resins were used, magnetic recording media excellent in physical properties, especially in the durability and softness required of magnetic tapes and the like, were obtained. The cross-linking, curing reaction further improved the thermal resistance. On the other hand, the higher the molecular weight the less the functional group density became, and this effects a tendency toward lower radiation curability. Therefore, a relatively high dosage of radiation is necessary. Where a resin with a low molecular weight of less than 2000 was employed, a resinous composition with good radiation curability was obtained. However, the coating film made of the composition containing the low-molecular-weight resin was not adequately soft, and an increase in the percentage of the magnetic powder in the composition gave a brittle magnetic coating, which was not wear-resistant enough for use in making a magnetic tape. For the realization of the present invention, further investigations were made to find ways of balancing the radiation curability with physical properties, especially the durability, softness, and heat resistance, desired of the coating film. As a result, it has now been found that a coating film having desirable physical properties is obtained with increased functional group density, improved radiation curability, and a decreased dosage of radiation required, by using an aqueous binder composed of a water-soluble resin and/or a water-dispersible resin, each having a molecular weight of at least than 5000, preferably at least 8000, and curable upon exposure to radiation, together with a water-soluble resin and/or a water-dispersible resin, each having a molecular weight in the range of 200–5000, preferably in the range of 400–3000, and curable upon exposure to radiation.

The resins having at least one unsaturated double bond and which may be employed in the present invention include the compounds classifiable into four categories I to IV to be given later. Of those compounds, some cannot be made water-soluble by neutralization with alkali or other means, but they can be utilized in the form of aqueous dispersions by use of an emulsifier or other additives in the usual manner.

In order to form an aqueous solution and/or an aqueous dispersion of such resins, varied methods known in the art may be adopted. For example, some resins of high acid values can be made soluble in water by neutralization with ammonia or the like. A resin which cannot be made water-soluble in that way is once dissolved in a solvent or fluidized by heating to a molten state, and then mixed with water, with vigorous stirring in the presence of an emulsifying dispersant, until an aqueous dispersion results. The solvent, where used, is removed subsequently by heating and/or evacuation.

I. Reaction products of a compound having one or more hydroxyl groups in the molecule, a polyisocyanate compound, and a monomer having a group reactive with the isocyanate group and at least one radiation-curable, unsaturated double bond, at a molecular ratio of one to one or more to one or more. An example is a resin (prepolymer, oligomer, or teromer) having two acrylic double bonds at the molecular ends, prepared by reacting two moles of toluene diisocyanate with one mole of a bifunctional polyether (marketed by Asahi Denka Kogyo K.K. under the trade designation "Adeka Polyether P-1000"), which is made by adding propylene oxide to propylene glycol, and further reacting the resultant product with two moles of 2-hydroxyethyl methacrylate.

The compounds having one or more hydroxyl groups which may be employed include polyfunctional polyethers, such as "Adeka Polyether P-700", "-P-1000", and "-G-1500" (all made by Asahi Denka Kogyo), and "Polymeg 1000" and "-650" (both made by the Quaker Oats Co.); cellulose derivatives, such as nitrocellulose, acetylcellulose, and ethyl cellulose; hydroxyl-containing, partly saponified vinyl chloride-vinyl acetate copolymers, such as "Vinylite VAGH" (marketed by Union Carbide Corp. of the U.S.); polyvinyl formal; polyvinyl butyral; polyfunctional polyethers, such as "Polycaprolactone PCP-0200", "-PCP-0240", and "-PCP-0300" (all made by Union Carbide Corp.); saturated polyester resins prepared by the ester linkage of a saturated polybasic acid, such as phthalic, isophthalic, terephthalic, adipic, succinic, or sebacic acid, with a polyhydric alcohol, such as ethylene glycol, diethylene glycol, 1,4-butanediol, 1,3-butanediol, 1,2-propylene glycol, dipropylene glycol, 1,6-hexane glycol, neopentyl glycol, glycerin, trimethylolpropane, or pentaerythritol; and acrylic polymers containing at least one type of hydroxyl-containing acrylic or methacrylic esters as the polymer component.

Examples of the polyisocyanate compounds useful for the invention are 2,4-toluene diisocyanate, 2,6-toluene diisocyanate, 1,4-xylene diisocyanate, m-phenylene diisocyanate, p-phenylene diisocyanate, hexamethylene diisocyanate, isophorone diisocyanate, and "Desmodur L" and "-IL" (both made by Farbenfabriken Bayer AG of West Germany).

The compounds having groups reactive with the isocyanate group and also having at least one radiation-curable, unsaturated double bond include: hydroxyl-containing esters, such as 2-hydroxyethyl ester, 2-hydroxypropyl ester, and 2-hydroxyoctyl ester, of acrylic and methacrylic acids; monomers having active hydrogen reactive with the isocyanate group and also having acrylic double bonds, such as acrylamide, methacrylamide, and N-methylolacrylamide; and compounds having active hydrogen reactive with the isocyanate group and also containing at least one radiation-curable, unsaturated double bond, such as allyl alcohols, maleic acid esters of polyhydric alcohols, and mono- and diglycerides of long-chain fatty acids having unsaturated double bonds.

II. Reaction products of a compound having one or more epoxy groups in the molecule and a monomer having a group reactive with the epoxy group and at least one radiation-curable, unsaturated double bond, at a molecular ratio of one to one or more. An example is a resin, prepolymer, or oligomer in which an acrylic double bond is held in pendant fashion in the molecule, prepared by reacting acrylic acid with an epoxy-containing thermoplastic resin obtained by radical polymerization of glycidyl methacrylate, and thereby effecting a ring-opening reaction of the carboxyl and epoxy groups. Another example is a resin (prepolymer or oligomer) prepared by reacting maleic acid and effecting a ring-opening reaction of the carboxyl and epoxy groups so that the product has at least one radiation-curable, unsaturated double bond in the molecular structure.

Examples of the compounds having one or more epoxy groups in the molecule are homopolymers, or copolymers with other polymerizable monomers, of an epoxy-containing acrylic or methacrylic ester, such as glycidyl acrylate or glycidyl methacrylate; "Epikote 828", "-1001", "-1007", and "-1009" (all made by Shell Chemical Co.); and various types of epoxy resins.

Among the compounds having a group reactive with the epoxy group and at least one radiation-curable, unsaturated double bond are: carboxyl-containing acrylic monomers, such as acrylic and methacrylic acids; primary- or secondary-amino-containing acrylic monomers, such as methylaminoethyl acrylate and methylaminomethacrylate; and polybasic acid monomers having at least oen radiation-curable, unsaturated double bond, such as maleic, fumaric, crotonic, and undecylenic acids.

III. Reaction products of a compound having one or more carboxyl groups in the molecule and a compound having a group reactive with the carboxyl group and at least one radiation-curable, unsaturated double bond, at a molecular ratio of one to one or more. An example is a resin (prepolymer or oligomer) prepared by reacting glycidyl methacrylate with a carboxyl-containing thermoplastic resin obtained by solution polymerization of methacrylic acid, and effecting a ring-opening reaction of the carboxyl and epoxy groups in the same manner as in II. above, thus introducing an acrylic double bond into the molecule of the product.

The compounds containing one or more carboxyl groups in the molecule are, e.g.: polyesters having a carboxyl group or groups in the molecular chain or at the molecule ends; and homopolymers of radically polymerizable and carboxyl-containing monomers, such as acrylic acid, methacrylic acid, maleic anhydride, and fumaric acid, and copolymers of such monomers with other polymerizable monomers.

Examples of the compounds having a group reactive with the carboxyl group and at least one radiation-curable, unsaturated double bond are glycidyl acrylate and glycidyl methacrylate.

IV. Polyester compounds containing at least one radiation-curable, unsaturated double bond in the molecular chain. An example is an unsaturated polyester resin (prepolymer or oligomer) having at least one radiation-curable, unsaturated double bond, which consists of a saturated polyester resin formed by ester linkage of a polybasic acid and a polyhydric alcohol as classified in I. above, with part of the polybasic acid being replaced by maleic acid.

The polybasic acid and polyhydric alcohol components of the saturated polyester resin may be any of the compounds mentioned in I. above, and the radiation curable, unsaturated double bond may be that of maleic acid, fumaric acid, or the like.

The radiation-curable, unsaturated polyester resin is made in the usual manner from at least one type each of polybasic acid and polyhydric alcohol components with the addition of maleic acid, fumaric acid, or the like. In the presence of a catalyst the starting material mixture is allowed to react for dehydration or dealcoholation in a nitrogen atmosphere at a temperature in the range of 180°–200° C., and, following the conclusion of the reaction, the temperature is raised to 240°–280° C., and then condensation is effected under reduced pressure of 0.5–1.0 mmHg to obtain the objective polyester resin. The content of maleic, fumaric, or other acid in the starting mixture is in the range of 1–40 mol%, preferably in the range of 10–30 mol%, in the total acid amount for the facility of cross-linking and for desirable radiation curability during the course of manufacture of the magnetic recording medium.

V. Depending on the intended uses of the products, low-molecular-weight compounds having at least one radiation-curable, unsaturated double bond may also be employed. Examples of those low-molecular-weight compounds are styrene, ethylacrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, trimethylolpropane triacrylate, trimethylolpropane trimethacrylate, polyethylene glycol (meth)acrylate, and polypropylene glycol di(meth)acrylate.

The thermoplastic resin free from any unsaturated double bond curable upon irradiation may be any aqueously dispersible resin of rubber or acrylic type. Examples are styrene-butadiene copolymer, acrylic ester copolymer, vinyl chloride-vinyl acetate copolymer, styrene-butadiene-acrylic acid copolymer, acrylonitrile-butadiene copolymer, polyurethane, polyvinylidene chloride, and vinylidene chloride-acrylic acid copolymer.

Such a resin may be obtained either as an aqueous dispersion as the direct product or by aqueously dispersing by the use of an emulsifying dispersant before using the product in the manner already described. In the case of a thermoplastic, water-soluble resin, any of natural, synthetic, or semisynthesized resins may be employed. Examples are polyvinyl alcohol, carboxymethyl cellulose, sodium acrylate copolymer, isobutylene-maleic anhydride ammonium salt copolymer, styrene-maleic anhydride ammonium salt copolymer, and vinylpyrrolidone copolymer.

In practicing the invention, water is utilized as a solvent or dispersion medium. Alternatively, for improved applicability on the base of polyester film or the like, part of the water may be replaced by a solvent compatible with water, e.g., isobutanol, butanol, ethyl cellosolve, diacetone alcohol, 3-methoxybutanol, isopropyl cellosolve, or butyl cellosolve.

The substrate to be coated with the magnetic coating material in accordance with the present invention may be the polyethylene terephthalate film that is in wide use as a base material for magnetic recording media. For applications where heat resistance is a necessity, a polyimide film, polyamide film or the like may be utilized. In the case of a polyester film as a thin base, it is often used after monoaxial or biaxial stretching. Other applications include coating of paper.

The magnetic powders which may be used in the present invention are $\gamma$-$Fe_2O_3$, $Fe_3O_4$, Co-doped $\gamma$-$Fe_2O_3$, Co-doped $\gamma$-$Fe_2O_3$-$Fe_3O_4$ solid solution, Co-base-compound-coated $\gamma$-$Fe_2O_3$- and Co-base-compound-coated $Fe_3O_4$ (including those oxidized to an intermediate state between itself and $\gamma$-$Fe_2O_3$). (The term "Co-base compound" as used herein means cobalt oxide, cobalt hydroxide, cobalt ferrite, cobalt ion-adsorbates and the like which enable the magnetic powder to take advantage of the magnetic anisotropy of cobalt in improving its coercive force.)

For the radiation-curable, magnetic coating material of the invention, it is advisable to use various additives usually employed for those applications, such as an anti-static agent, lubricant, dispersant, sensitizer, leveling agent, wear-resisting agent, and film-reinforcing agent, to suit the particular end uses.

The radioactive rays for use in cross-linking and curing the magnetic coating film in accordance with the invention may be electron beams from an electron-beam accelerator as the source, $\gamma$-rays from $Co^{50}$, $\beta$-rays from $Sr^{90}$, X-rays from an X-ray generator, or the like. The electron beams from an electron-beam accelerator are most advantageously used because of the ease of controlling the absorbed dose, introducing the source into the process line, and providing shield from the ionizing radiation.

With regard to the characteristics of electron beams for use in curing the magnetic coating film, it is desirable from the standpoint of transmissivity to adopt an electron-beam accelerator which operates with an acceleration voltage of 100–750 KV, preferably 150–300 KV, and effect the irradiation so that the absorbed dose may be in the range of 0.5–10 megarads.

In the case of a magnetic tape, in particular, the film of coating to be cured is thin, and therefore the adoption of the low-dosage electron-beam accelerator made by Energy Science Co. of the U.S. (trademarked "Electron-curtain system") or the equivalent is extremely advantageous because of the ease with which the accelerator can be installed on the tape coating line and the shield can be established against secondary X-rays inside the apparatus.

Of course, the Van de Graff accelerator in extensive use as an electron-beam accelerator may be employed instead.

In radiation curing, exposure of the magnetic coating film to radiation in a stream of $N_2$, He, or other inert gas is important. A film of magnetic coating, which is very thickly filled with a magnetic pigment, is highly porous in structure. When it is exposed to electron beams in air, $O_3$ and the like produced by the irradiation for the cross-linking of the binder components will have an adverse effect, keeping the radicals formed in the polymer from effectively acting in the cross-linking reaction. The adverse effect is exercised not merely on the surface of the magnetic coating layer but also deep into the porous film, thus hampering the cross-linking of the binder. For this reason it is essential to maintain an inert gas atmosphere of $N_2$, He, $CO_2$ or the like around the portion to be irradiated.

Next, the present invention is illustrated by the following examples and comparative examples. Throughout these examples the "parts" and "%" are all by weight.

Before proceeding to the examples, typical methods of synthesizing resins for use in the invention will be explained below:

Example of resin synthesis (a)

One hundred parts of a copolymer of vinyl chloride, vinyl acetate, and vinyl alcohol at a ratio by weight of 93:2:5, having a molecular weight of 18000 was dissolved with heat in a mixed solvent consisting of 150 parts each of toluene and methyl ethyl ketone. After the addition of 0.002 part each of tin octylate and hydroquinone to the solution, the mixture was heated to 80° C. under a stream of nitrogen, and with the addition of 7.5 parts of tolylene diisocyanate (TDI) to be described later, the mixture was allowed to react at 80° C. for 5 hours to synthesize a base resin. Next, 6 g of polyvinyl alcohol and 6 g of a nonionic surfactant (marketed by Daiichi Kogyo Seiyaku Co. under the trade designation "Evane 785") were dissolved in 1 kg of water, and the resin solution prepared above was slowly flown, with stirring by a homomixer, into this aqueous solution. Following the completion of this addition, the mixture was agitated for a further period of 30 minutes for emulsification. The mixed solution was heated and boiled to remove the solvent, and excess water was distilled away to adjust the solid content to 30%. Thus, an acrylic double bond-containing vinyl chloride-vinyl acetate copolymer emulsion (a) was obtained.

(Synthesis of TDI adduct)

In a one-liter flask 348 parts of tolylene diisocyanate (TDI), 0.07 part of tin octylate, and 0.05 part of hydroquinone were heated to 80° C. under a nitrogen stream. With stirring, 260 parts of 2-hydroxyethyl methacrylate (2HEMA) was added dropwise to the above mixture over 2 hours. After the addition, the whole mixture was allowed to react for 3 hours, and a 2HEMA adduct of TDI was obtained.

Example of resin synthesis (b)

A four-necked flask was charged with 237 parts of phthalic anhydride, 39.2 parts of maleic anhydride, 108 parts of 1,3-butylene glycol, 134 parts of dipropylene glycol, and 0.1 part of hydroquinone. In a nitrogen atmosphere at 180° C. the mixture was allowed to react, with stirring, for 8 hours to synthesize a base resin. Next, 50 g of polyvinyl alcohol and 10 g of a nonionic surfactant ("Evane 785") were dissolved in 1 kg of water, and the solution was heated to 80° C., and then, with stirring by a homomixer, the above resin was gradually added to this aqueous solution. After the addition, the mixture was further agitated for 30 minutes, and an unsaturated polyester emulsion (b) with a solid content was 30% was obtained.

Example of resin synthesis (c)

One hundred parts of isopropyl alcohol was charged into a four-necked flask and, with stirring at 80° C., 30 parts of methyl acrylate, 40 parts of n-butyl acrylate, 30 parts of methacrylic acid, and 0.5 part of t-butyl perbenzoate were added dropwise over 3 hours. After the addition, the whole mixture was agitated at 80° C. for 3 hours. Next, 17 parts of glycidyl methacrylate, 1 part of tetraethylammonium chloride, and 0.1 part of hydroquinone were added to the mixed solution, and the whole mixture was allowed to react at 80° C. for 10 hours to obtain a base resin. To the resulting resin were added 37 parts of an aqueous solution of 29% ammonia and then 224 parts of water, with stirring, for emulsification. An aqueous solution (c) of a water-soluble resin with a solid content of 25% resulted.

Example of resin synthesis (d)

Fifty parts each of toluene and methyl ethyl ketone were charged into a four-necked flask. While the mixture was being agitated at 80° C., 40 parts each of methyl methacrylate and n-butyl acrylate, 20 parts of 2-hydroxyethyl methacrylate, and 0.5 part of t-butyl perbenzoate were added dropwise over 3 hours. After the dropping, the whole mixture was heated at 80° C. and agitated for 3 hours. Next, 22 parts of a TDI-allyl alcohol adduct prepared in the same way as in Example of resin synthesis (a) was added and then 0.005 part each of tin octylate and hydroquinone were added. The whole mixture was allowed to react at 80° C. for 5 hours to obtain a base resin. Generally in conformity with the procedure of Example of resin synthesis (a), the base resin was emulsified in 1 kg of an aqueous solution of the nonionic surfactant and polyvinyl alcohol, the emulsion was boiled to remove the solvent, and the water was distilled away, leaving a solid content of 25% in an allyl-containing acrylic emulsion (d) as the product.

Example of resin synthesis (e)

A flask was charged with 250 parts of ε-caprolactone polyol "PCL 220" (trademark of a Daicel Ltd. product with a molecular weight of 2000), 122.2 parts of 2-hydroxyethyl methacrylate, 0.024 part of hydroquinone, and 0.033 part of tin octylate. The charge was heated and dissolved at 80° C., and 163.6 parts of TDI was gradially dropped into the solution. After the addition, the whole mixture was allowed to react, with stirring, at 80° C. for 5 hours to prepare a base resin. Then, generally in conformity with the procedure of Example of resin synthesis (b), the base resin was emulsified with a surfactant and an aqueous polyvinyl alcohol solution. An acrylic double bond-containing urethane prepolymer emulsion (e) with a solid content of 30% was obtained.

Example of resin synthesis (f)

A flask was charged with 277 parts of trimethylolpropane, 264 parts of isophthalic acid, and 87 parts of trimellitic anhydride, and the charge was allowed to react, with stirring, in a nitrogen atmosphere at 180° C. for 4 hours. The resultant was cooled to 110° C., and was reacted with the addition of 50 parts of xylene, 0.7 part of hydroquinone, 3 parts of p-toluenesulfonic acid, and 117 parts of acrylic acid for 15 hours to obtain a base resin. By the addition of 5 parts of an aqueous solution of 29% ammonia and then of 1500 parts of water to the base resin, an aqueous solution (f) of a water-soluble polyester acrylate with a solid content of 30% was obtained.

Example of resin synthesis (g)

A mixture consisting of 200 parts of "Epikote 828" (trademark of an epoxy resin marketed by Shell Chemical Co.), 1 part of N,N-dimethylbenzylamine, and 0.5 part of hydroquinone was heated to 100° C. and, with stirring, 72 parts of acrylic acid was added dropwise over 2 hours. After the addition, the mixture was allowed to react for 15 hours to an acid value of not more than 5. Then, 98 parts of maleic anhydride was added and a reaction was effected at 100° C. for 5 hours to obtain a base resin. With the addition of 70 parts of an aqueous solution of 29% ammonia and then 1050 parts of water, an aqueous solution (g) of an acrylic double bond-containing, water-soluble epoxy prepolymer with a solid content of 25% was obtained.

EXAMPLE 1

A composition consisting of

| | |
|---|---|
| cobalt-coated acicular $\gamma$-$Fe_2O_3$ (length 0.4 $\mu$m, breadth 0.05 $\mu$m, Hc 600 Oe) | 120 parts |
| carbon black (for antistatic use, ("Mitsubishi Carbon Black MA-600") | 5 parts |
| $\alpha$-$Al_2O_3$ powder (0.5 $\mu$m in particle size) | 2 parts |
| dispersing agent (lecithin derived from purified soybean oil) | 3 parts |
| water | 100 parts | was mixed up by a ball mill for 3 hours, and the acicular magnetic iron oxide was thoroughly wetted with the dispersing agent.

Next, a binder mixture consisting of

| | |
|---|---|
| emulsion (a) | 15 parts (on solids basis) |
| emulsion (e) | 15 parts (on solids basis) |
| water | 200 parts |
| lubricant (polyether-modified silicone oil marketed by Shin-etsu Chemical Co. under the trade designation "KF-351") | 3 parts | was mixed and dissolved. It was placed into the ball mill where the magnetic powder had been treated in advance and the two were again mixed and dispersed into each other for 42 hours.

The magnetic coating material thus prepared was applied on a 15 $\mu$m-thick polyester film. After magnetic field orientation on a (1600-gauss) permanent magnet, the coating was dried to remove water as the solvent by an infrared lamp or hot air, smoothed on the surface, and was hardened by irradiation with electron rays in an $N_2$ atmosphere by an ESI "Electro-curtain" type electron-beam accelerator at an acceleration voltage of 150 KeV with an electrode current of 15 mA to a total dosage of 5 mrads.

The resulting film was slit into a ½ in.-wide ribbon as a video tape (Specimen #1).

COMPARATIVE EXAMPLE 1

A composition consisting of

| | |
|---|---|
| cobalt-coated acicular $\gamma$-$Fe_2O_3$ (length 0.4 $\mu$m, breadth 0.05 $\mu$m, Hc 600 Oe) | 120 parts |
| carbon black (for antistatic use, ("Mitsubishi Carbon Black MA-600") | 5 parts |
| $\alpha$-$Al_2O_3$ powder (0.5 $\mu$m in particle size) | 2 parts |
| dispersing agent (lecithin derived from purified soybean oil) | 3 parts |
| water | 100 parts | was mixed in a ball mill for 3 hours, and the acicular magnetic iron oxide was thoroughly wetted with the dispering agent.

Next, a mixture consisting of

| | |
|---|---|
| Nisshin Chemical Ind.'s vinyl chloride-vinyl acetate copolymer emulsion (trademark "Vinyplan 200A") | 25 parts (on solids basis) |
| water | 200 parts |
| lubricant ("KF-351") | 3 parts | was mixed and dissolved. It was placed into the ball mill where the magnetic powder had been treated in advance and the two were again mixed and dispersed into each other for 42 hours.

After the dispersion of the magnetic coating material, 5 parts (in terms of the solids) of an aqueous dispersion* of an isocyanate compound (marketed by Nippon Polyurethane Ind. Co. under the trade designation "Coronate AP Stable") which is cross-linkable by a reaction with the functional groups based on hydroxyl groups of the binder in the coating composition was added to the material and mixed for 20 minutes in the ball mill.

The magnetic coating material thus prepared was applied on a 15 $\mu$m-thick polyester film. After magnetic field orientation on a (1600-gauss) permanent magnet, the coating was dried to remove water as the solvent by an infrared lamp or hot air, smoothed on the surface, and the film roll was held in an open kept at 100° C. for 48 hours to promote the isocyanate-induced cross-linking reaction.

The tape so obtained was slit into a ½ in.-wide tape as a video tape (Specimen A).

*Preparation of an aqueous solution of Coronate AP Stable

Fifty parts of Coronate AP Stable was dissolved in 100 parts of cellosolve acetate. Into this solution, with stirring, a solution of 2 g of a nonionic surfactant ("Evane 785") in 200 g of water was introduced dropwise, so that an emulsion of a crosslinking agent with a solid content of 14% was obtained.

Table 1 shows the magnetic properties and electromagnetic conversion characteristics of the video tapes thus made.

TABLE 1

| | Video tape characteristics | | | | | | |
|---|---|---|---|---|---|---|---|
| | $Hc^{(1)}$ (Oe) | $Br^{(1)}$ | $Br/Bm^{(1)}$ (gauss) | $Br'/Br''^{(1)}$ | Sfce.$^{(2)}$ propty. (dB) | Electromag. convn. char.$^{(3)}$ | |
| | | | | | | 4 MHz (dB) | Y-S/N (dB) |
| Example (Spec. #1) | 660 | 1600 | 0.83 | 2.10 | +6.5 | +1.5 | +2.0 |
| Comp. Ex. (Spec. A) | 670 | 1450 | 0.81 | 2.00 | +5.0 | 0 | 0 |

Notes:
$^{(1)}$Measured by Toei Kogyo's orientation meter, Model "VSM-III", with the application of a magnetic field of 5000 G.
$^{(2)}$The degree of surface gloss based on that of a reference glass plate which was 0 dB.
$^{(3)}$Determined with the test tape set on a Matsushita video deck, Model "National Maclord 6600", on the basis of the data of Comparative Example (Spec. A) as 0 dB.

As is clear from the values of squareness ratio (Br/Bm), orientation (Br'/Br"), and residual flux density (Br) in Table 1, the electron beam-cured binder was equivalent to or superior to the thermally cured binder in dispersibility for the magnetic particles. Also, with the electron beam curing there occurred no transfer of the surface coarseness of the back surface of the base to the magnetic coating surface as observed in the course of thermal curing. Thus, because the magnetic coating surface maintains good surface quality, the electron beam-cured tape (Specimen #1) showed improvements over the thermally curved tape (Specimen A) in electromagnetic conversion characteristics, such as the RF sensitivity at 4 MHz and the Y-S/N.

Figure 1:
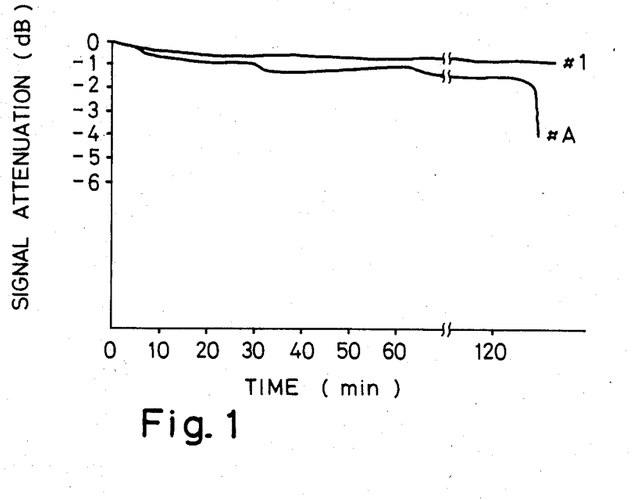
FIGS. 1 to 3 represent characteristic curves of Examples of this invention and of Comparative Examples.

FIG. 1 is a graph showing the rates of attenuation (on still reproduction) of signals with respect to the reproduction output, as measured by recording signals on the video tape specimens by a video tape recorder (Matsushita Electric's Model "NV-3120") for open reels conforming to the EIAJ unified standards and then by reproducing the still images with a tension of 200 grams applied on the takeup side by a spring balancer.

As is obvious from the graph, the cross-linking of the binder by irradiation with electron beams gave a tough coating surface with a remarkably reduced signal attenuation, which withstood severe abrasive conditions such that the relative velocity of the magnetic coating surface and the head was as high as 11 m/sec.

Figure 2:
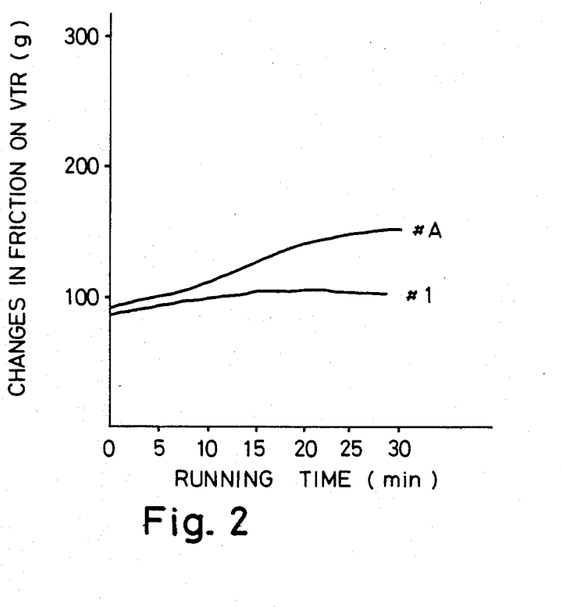

FIG. 2 is a graphic representation of changes in friction of test video tapes with running time. Each tape was held for 5 days under changing conditions in 5 cycles, each starting with a temperature of $-10°$ C. and a relative humidity of 0% and ending with 60° C. and 80%. After this period, the specimen was allowed to stand at room temperature for 24 hours. It was then set on the same video tape recorder as used for the still reproduction test, a tension analyzer marketed by Nippon Jido Seigyo Co., Model "IVA-500", was set between the head drum and the pinch roller of the recorder, and the changes in tension on the takeup side of the test tape with running time were measured.

This test permits evaluation of not only the friction coefficient level of the magnetic film itself of each test tape but also the degree of deterioration of tape running quality with exudation of the low-molecular-weight components from the magnetic film, and stability of the tape against the environmental conditions such as temperature and humidity.

As can be seen from the figure, the electron beam-cured tape of Specimen #1 showed a low friction coefficient and adequate cross-linking with the low-molecular-weight elastomer component. With no exudation to the coating surface, the tape possessed good running stability against changes in temperature and humidity.

As compared with Specimen #1, Specimen A was somewhat unstable, supporting the uniformity of the electron beam-induced cross-linking.

EXAMPLE 2

A composition consisting of

| | |
|---|---|
| Fe-alloy acicular magnetic powder (length 0.3 $\mu$m, breadth 0.04 $\mu$m, Hc 1100 Oe) | 120 parts |
| carbon black ("Mitsubishi Carbon Black MA-600") | 5 parts |
| $\alpha$-Al$_2$O$_3$ powder (0.5 $\mu$m in particle size) | 2 parts |
| dispersing agent (sodium oleate) | 2 parts |
| water | 100 parts | was mixed for 3 hours, and the fine magnetic alloy powder was thoroughly wetted with the dispersing agent.

Next, a mixture consisting of

| | |
|---|---|
| emulsion ("Vinyplan 200A") | 15 parts (on solids basis) |
| aqueous solution (f) | 15 parts (on solids basis) |
| water | 200 parts |
| lubricant (Shin-etsu Chemical's polyester-modified silicone oil trade designation "KF-351") | 3 parts | was mixed with the previously treated magnetic powder composition by a high speed mixer for 70 minutes, and the resulting mixture was dispersed in a sand mill for 4 hours.

The magnetic coating material thus prepared was applied on a 15 $\mu$m-thick polyester film. After magnetic field orientation, solvent removal by drying, and surface smoothing, the coating was hardened by irradiation with electron beams in an N$_2$ atmosphere by an ESI "Electro-curtain" type electron-beam accelerator at an acceleration voltage of 150 KeV with an electrode current of 15 mA to a total dosage of 5 mrads.

The resulting film was slit into a $\frac{1}{2}$ in.-wide ribbon as a video tape, Specimen #2.

COMPARATIVE EXAMPLE 2

A composition consisting of

| | |
|---|---|
| Fe—alloy acicular magnetic powder | 120 parts |
| carbon black ("Mitsubishi Carbon Black MA-600"). | 5 parts |
| $\alpha$-Al$_2$O$_3$ powder (0.5 $\mu$m in particle size) | 2 parts |
| dispersing agent (sodium oleate) | 2 parts |
| water | 100 parts | was mixed up for 3 hours, and the fine magnetic alloy powder was thoroughly wetted with the dispersing agent.

Next, a mixture consisting of

| | |
|---|---|
| emulsion ("Vinyplan 200A") | 25 parts (on solids basis) |
| water | 200 parts |
| lubricant | 3 parts | was mixed with the previously treated magnetic powder composition by a high speed mixer for 70 minutes, and the resulting mixture was dispersed in a sand mill for 4 hours. After the dispersion the magnetic coating material was mixed with 5 parts by weight (in terms of solids) of an aqueous dispersion of Nippon Polyurethane's "Coronate AP Stable" for 20 minutes.

The magnetic coating material so obtained was applied on a 15 μm-thick polyester film. After magnetic field orientation, solvent removal by drying, and surface smoothing the film roll was held in an oven kept at 100° C. for 48 hours to promote the cross-linking reaction with the aid of the isocyanate.

The film obtained was slit into a ½ in.-wide ribbon as a video tape, Specimen B.

Table 2 shows the properties of the alloy video tapes.

TABLE 2

Properties of alloy video tapes

| | Surface quality | Electromag. convn. charac.(2) | | Recipro. run durability(3) at 40° C. 60% | No. of dropout(4) per min. |
|---|---|---|---|---|---|
| | | 4 MHz | Y-S/N | | |
| Example (Spec. #2) | 13.0 | +2.0 | +3.0 | over 250 runs | 0.5 |
| Comp. Ex. (Spec. B) | 10.0 | 0 | 0 | 200 runs | 1.2 |

Notes:
(1)The degree of surface gloss based on that of a reference glass plate which was 0 dB.
(2)Determined with the test tape set on a video deck, "National Baclord 6600", on the basis of the data of Comparative Example, Spec. B, as 0 dB.
(3)Ditto
(4)Ditto As Table 2 clearly indicates, the tape Specimen #2 was far superior to Specimen B in electromagnetic conversion characteristics. This means that the electron-beam curing eliminated the transfer of the surface coarseness of the back side of the base to the magnetic coating surface, a phenomenon that occurs in the course of thermal curing.

Also, while Specimen #2 used as one of the binder components a resin having no radiation-curable, unsaturated double bond, the coating material was so thoroughly cross-linked that the tape exhibited excellent properties such as reciprocating running durability under hot and humid conditions and the fewer frequency of dropouts.

EXAMPLE 3

A composition consisting of

| | |
|---|---|
| Fe-alloy acicular magnetic powder (length 0.3 μm, breadth 0.04 μm, Hc 1100 Oe) | 120 parts |
| dispersing agent (sodium oleate) | 2 parts |
| water | 100 parts | was mixed well with a powerful mixer for 3 hours, and the fine magnetic alloy powder was thoroughly wetted with the dispersing agent.

Next, a mixture consisting of

| | |
|---|---|
| emulsion (b) | 18 parts (on solids basis) |
| emulsion (e) | 12 parts (on solids basis) |
| water | 200 parts |
| lubricant (polyethylene glycol monostearate marketed by Nikko Chemicals Co. under the trade designation "NIKKOL MYS-40). | 3 parts | was thoroughly mixed and dissolved.

The resultant was mixed with the previously treated magnetic powder composition by a high speed mixer for 70 minutes, and the mixed composition was mixed and dispersed by a sand mill for 4 hours.

The magnetic coating material thus prepared was applied on a 12 μm-thick polyester film. After magnetic field orientation, solvent removal by drying, and surface smoothing, the coating was hardened by irradiation with electron beams in an N₂ atmosphere by an "Electro-curtain" type electron-beam accelerator at an acceleration voltage of 150 KeV with an electrode current of 15 mA to a total dosage of 5 mrads.

The resulting film was slit into a 3.8 mm-wide ribbon as an alloy-coated audio cassette tape (Specimen #3).

EXAMPLE 4

A composition consisting of

| | |
|---|---|
| Fe-alloy acicular magnetic powder (length 0.3 μm, breadth 0.04 μm, Hc 1100 Oe) | 120 parts |
| dispersing agent (sodium oleate) | 2 parts |
| water | 100 parts | was mixed well with a powerful mixer for 3 hours, and the fine magnetic alloy powder was thoroughly wetted with the dispersing agent.

Next, a mixture consisting of

| | |
|---|---|
| Seiko Chemical's acrylic emulsion (trademark "Hilos X. T-43") | 10 parts (on solids basis) |
| aqueous solution (c) | 10 parts (on solids basis) |
| aqueous solution (g) | 10 parts (on solids basis) |
| water | 200 parts |
| lubricant ("NIKKOL MYS-40") | 3 parts | was thoroughly mixed and dissolved.

The resultant composition was mixed with the previously treated magnetic powder composition by a high speed mixer for 70 minutes, and was further mixed and dispersed in a sand mill for 4 hours.

The magnetic coating material prepared in this way was applied on a base to form a tape in the same manner as described in Example 3.

The tape was then slit into a ribbon 3.8 mm in width, and an alloy-coated audio cassette tape (Specimen #4) was obtained.

EXAMPLE 5

A composition consisting of

| | |
|---|---|
| Fe-alloy acicular magnetic powder (length 0.3 μm, breadth 0.04 μm, Hc 1100 Oe) | 120 parts |

-continued

| | |
|---|---|
| dispersing agent (sodium oleate) | 2 parts |
| water | 100 parts | was mixed well with a powerful mixer for 3 hours, and the fine magnetic alloy powder was thoroughly wetted with the dispersing agent.

Next, a mixture consisting of

| | |
|---|---|
| emulsion (a) | 30 parts |
| | (on solids basis) |
| water | 200 parts |
| lubricant ("NIKKOL MYS-40") | 3 parts | was thoroughly mixed and dissolved. The resultant composition was mixed with the previously treated magnetic powder composition by a high speed mixer for 70 minutes, and was further mixed and dispersed in a sand mill for 4 hours.

The magnetic coating material thus obtained was applied on a base to make a tape in the same manner as in Example 3.

The tape was slit into a 3.8 mm-wide ribbon as an alloy-coated audio cassette tape (Specimen #5).

Table 3 summarizes the characteristics of the alloy-coated audio cassette tapes made in the foregoing way. Specimen #3 that used a binder blending an electron beam-sensitive component with a molecular weight of 5000 or more with an electron beam-sensitive component with a molecular weight of less than 5000, and Specimen #4 that used a binder blending the above two components with a resin insensitive to the electron beams had well-balanced characteristics as audio tapes and exhibited good binder affinity for the magnetic alloy powder, superior surface formability of the coating, and very smooth surface with high residual flux density, as compared with Specimen #5 that used a binder comprising only the electron beam-sensitive resin with a molecular weight of not less than 5000.

Thus, tapes of very high densities over MOL ranges from the low frequency of 333 Hz to the high frequency of 16 KHz were obtained.

Further, in the physical properties that represent the reliability of tapes, i.e., the running time up to the point where the tape begins to squeal and the durability in repeated, reciprocating passages on a car stereo set, the tapes that used the mixed binder of resins of different molecular weights properly combined rigidity and softness due to good curability, and hence they proved superior in those properties to the tape, Specimen #5, that used only a resin having a molecular weight of over 5000 as the binder.

TABLE 3

| | | | | Properties of audio cassette tapes | | | | |
|---|---|---|---|---|---|---|---|---|
| | | | | | Electromag. convn. chrac.[3] | | | Tape | Recipro. |
| Ex. | $Hc^{(1)}$ (Oe) | $Br^{(1)}$ (gauss) | Surface qlty.[2] (dB) | MOL 333 Hz (dB) | MOL 8 KHz (dB) | MOL 16 KHz (dB) | squeal start[4] (hr) | run durability[5] (No. of run) |
| #3 | 1060 | 3400 | 212.5 | +3.2 | +6.0 | +11.0 | 24 | Stopped aft. 230 runs. |
| #4 | 1060 | 3200 | 12.0 | +3.0 | +5.5 | +10.5 | 24 | Over 250 runs. |
| #5 | 1070 | 3000 | 11.0 | +2.7 | +4.7 | +9.5 | 20 | Stopped aft. 180 runs. |

Notes:
[1] Measured by Toei Kogyo's orientation meter, Model "VSM-III" with the application of a magnetic field of 5000 G.
[2] The degree of surface gloss based on that of a reference glass plate which was 0 dB.
[3] Measured with the test tape set in the metal position on Nakamichi Kenkyusho's cassette deck, Model "Nakamichi 582".
[4] Measured by a car stereo set, Model "National CX-318" at 40° C. and 80% RH.
[5] Measured by Matsushita's car stereo set, Model "CX-1147D" at 40° C. and 60% RH.

EXAMPLE 6

A mixture consisting of

| | |
|---|---|
| $\gamma\text{-Fe}_2\text{O}_3$ (length 0.8 μm, breadth 0.2 μm, HC 300 Oe) | 120 parts |
| carbon black (for antistatic use, "Mitsubishi Carbon Black MA-600"). | 5 parts |
| $\alpha\text{-Al}_2\text{O}_3$ powder (0.5 μm in particle size) | 2 parts |
| dispersing agent (Toho Chemical's polyoxyethylene sorbitan monooleate, trademarked "T-80") | 3 parts |
| water | 100 parts | was mixed up in a ball mill for 3 hours, and the magnetic iron oxide particles were thoroughly wetted with the dispersing agent.

Next, a mixture consisting of

| | |
|---|---|
| emulsion (d) | 20 parts |
| | (on solids basis) |
| Shin-Nakamura Chemical's "NK Ester A-14G" (acrylic monomer) | 10 parts |
| water | 200 parts |
| lubricant ("KF-351") | 3 parts | was thoroughly mixed and dissolved.

It was placed into the ball mill where the magnetic powder had been treated in advance and the two were again mixed and dispersed into each other for 42 hours.

The magnetic coating material thus obtained was applied on one side of a 188 μm-thick polyester film to form a coat about 10 μm thick. The coating layer was dried and smoothed on the surface, and then hardened by irradiation with electron beams in an $N_2$ atmosphere by an "Electron-curtain" type electron-beam accelerator at an acceleration voltage of 175 KeV with an electrode current of 15 mA to a total dosage of 2 mrads.

From the roll thus obtained a disc (about 65 mm in diameter) was blanked out as a magnetic disc, Specimen #6.

EXAMPLE 7

A composition consisting of

| γ-Fe₂O₃ (length 0.8 μm, breadth 0.2 μm, Hc 300 Oe) | 120 parts |
| --- | --- |
| carbon black (for antistatic use, "Mitsubishi Carbon Black MA-600"). | 5 parts |
| α-Al₂O₃ powder (0.5 μm in particle size) | 2 parts |
| dispersing agent (Toho Chemical's polyoxyethylene sorbitan mono-oleate "T-80") | 3 parts |
| water | 200 parts | was mixed in a ball mill for 3 hours, and the magnetic iron oxide was thoroughly wetted with the dispersing agent.

Next, a mixture consisting of

| "NK Ester A-14G" | 30 parts |
| --- | --- |
| water | 200 parts |
| lubricant (Shin-etsu Chemical's polyether-modified silicone oil "KF-351") | 3 parts | was mixed well and dissolved.

The solution was placed into the ball mill where the magnetic powder composition had been treated, and the both were mixed and dispersed for 42 hours.

The magnetic coating material thus prepared was applied, dried, smoothed on the surface, and then exposed to electron-beam radiation in the same manner as in Example 5.

From the resulting roll a disc (about 65 mm in diameter) was blanked out as a magnetic disc, Specimen #7.

Each of the magnetic discs thus obtained was set on a recorder-reproducer and was driven to pass in sliding contact with the magnetic head (at a pad pressure of 40 g/cm²) at a speed of about 1 m/sec, and the running time required for the dropouts to reach a cumulative number of 1000 was measured.

The results and the surface conditions of the magnetic coating layers were as shown in Table 4.

TABLE 4

| Wear resistances of magnetic discs | | |
| --- | --- | --- |
| | Running time | Surface condition |
| Ex. (Specimen #6) | Over 50 hrs. | No abnormality |
| Ex. (Specimen #7) | 40 hrs. | Some scratches |

Specimen #6 that used a binder blending an electron beam-curable resin having a molecular weight of not less than 5000 with an electron beam-curable resin having a molecular weight in the range of 200-5000 had proper rigidity and softness, exhibiting very good wear resistance as a magnetic disc.

On the other hand, Specimen #7 that used the binder comprising only the low-molecular weight "NK Ester A-14G" had a shorter running time and developed some scratches. This was because the coating film had sufficient rigidity but was not properly soft and was brittle.

EXAMPLE 8

A composition consisting of

| γ-Fe₂O₃ (length 0.8 μm, breadth 0.2 μm, Hc 300 Oe) | 120 parts |
| --- | --- |
| carbon black (for antistatic use, "Mitsubishi Carbon Black MA-600") | 5 parts |
| α-Al₂O₃ powder | 2 parts |

-continued

| (0.5 μm in particle size) | |
| --- | --- |
| dispersing agent (Toho Chemical's polyoxyethylene sorbitan mono-oleate "T-80") | 3 parts |
| water | 200 parts | wss mixed in a ball mill for 3 hours, and the magnetic iron oxide was thoroughly wetted with the dispersing agent.

Next, a mixture consisting of

| emulsion (b) | 15 parts (on solids basis) |
| --- | --- |
| aqueous solution (g) | 15 parts (on solids basis) |
| water | 200 parts |
| lubricant (Nikko Chemicals' polyethylene glycol monostearate "NIKKOL MYS-40") | 3 parts | was thoroughly mixed and dissolved.

The solution was placed in the ball mill where the magnetic powder composition had been treated, and the both were mixed and dispersed for 42 hours.

The magnetic coating material so prepared was applied on one side of a 75 μm-thick polyester film to form a coat about 10 μm thick. The coating layer was dried, smoothed on the surface, and was hardened by irradiation with electron beams in a $CO_2$ gas atmosphere by an "Electron-curtain" type electron-beam accelerator at an acceleration voltage of 175 KeV with an electrode current of 15 mA to a total dosage of 2 mrads.

The roll thus obtained was cut down to a predetermined size as a sealless commutation ticket, Specimen #8.

COMPARATIVE EXAMPLE 3

A composition consisting of

| γ-Fe₂O₃ (length 0.8 μm, breadth 0.2 μm, Hc 300 Oe) | 120 parts |
| --- | --- |
| carbon balck (for antistatic use, "Mitsubishi Carbon Black MA-600") | 5 parts |
| α-Al₂O₃ powder (0.5 μm in particle size) | 2 parts |
| dispersing agent (Toho Chemical's "T-80", polyoxyethylene sorbitan monooleate) | 3 parts |
| water | 100 parts | was mixed in a ball mill for 3 hours, and the magnetic iron oxide was thoroughly wetted with the dispersing agent.

Next, a mixture consisting of

| Nippon Zeon Co.'s styrene-butadiene copolymer emulsion "Hycar LX204" | 30 parts (on solids basis) |
| --- | --- |
| water | 200 parts |
| lubricant ("NIKKOL MYS-40") | 3 parts | was thoroughly mixed and dissolved.

This solution was placed in the ball mill where the magnetic powder composition had been treated, and the both were mixed and dispersed for 42 hours.

The magnetic coating material thus obtained was applied on a 75 μm-thick polyester film to form a coat about 10 μm thick, and the coating layer was dried and smoothed on the surface.

The resulting roll was cut down to a predetermined size as a sealless communication ticket, Specimen C.

Figure 3:
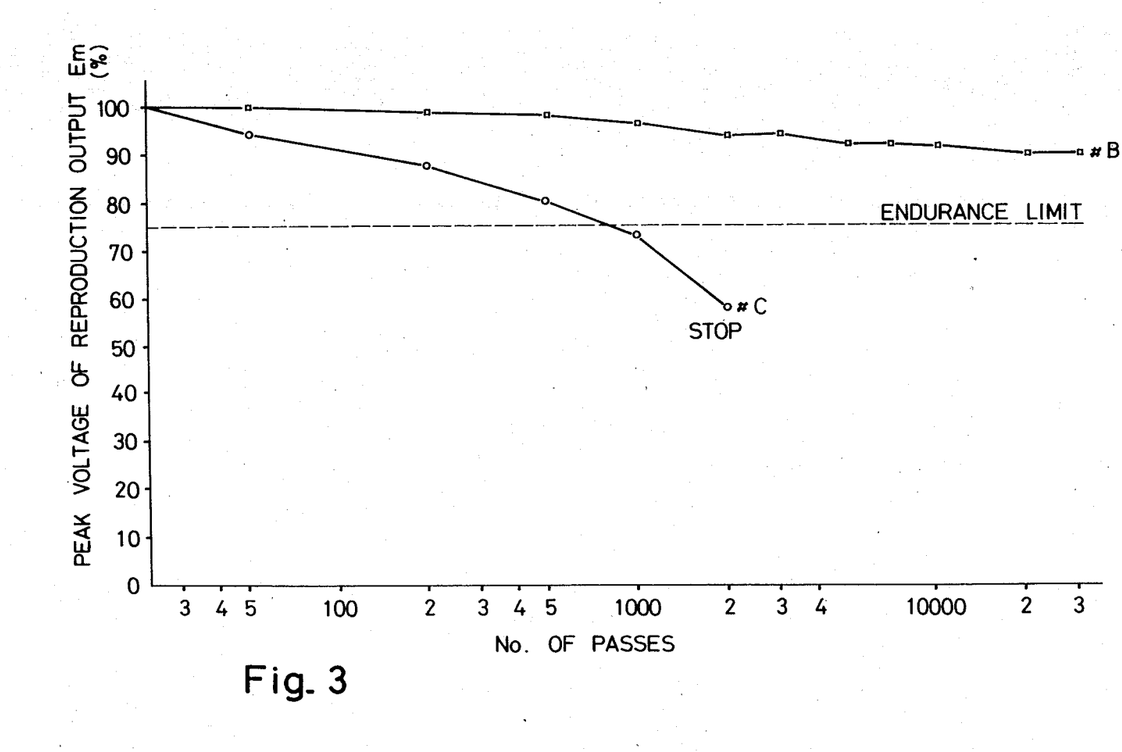

The sealless communication tickets made in the foregoing way were tested for gate passage endurance, and the results were as given in FIG. 3.

The graph shows the attenuation ratio (Em) of the peak voltage of the reproduction output after each given number of repeated passages to the initial reproduction output peak voltage which was 100%, and usually when the reproduction peak voltage has decreased below 25% of the initial reference level, the sealless commutation ticket is regarded to have closed its service life.

As plotted in FIG. 3, the voltage levels of pulse signal peaks up to 30,000 passes of repeated running were measured.

With Specimen C that used a binder based on a thermoplastic resin, the drop of the output with repeated passage was so serious that the ticket was of no practical use. In contrast with it, Specimen #8 that used an electron beam-curable resin manifested remarkable improvement, with a markedly smaller decline in output.

We claim:

1. A magnetic recording medium which comprises a base and a magnetic coating material consisting essentially of (1) a magnetic powder (2) a first radiation cured resin or mixture of resins which in the uncured state is a water soluble resin, a water dispersible resin or mixtures thereof having a molecular weight of at least 5000, each of said resins in the uncured state being selected from the group consisting of:

(a) Reaction products of a compound having at least one hydroxyl group in the molecule, a polyisocyanate compound, and a compound having a group reactive with the isocyanate group and at least one radiation curable, unsaturated double bond, at a molecular ratio of one to at least one;

(b) Reaction products of a compound having at least one epoxy group in the molecule and a compound having a group reactive with the epoxy group and at least one radiation-curable, unsaturated double bond, at a molecular ratio of one to at least one;

(c) Reaction products of a compound having at least one carboxyl group in the molecule and a compound having a group reactive with the carboxyl group and at least one radiation-curable, unsaturated double bond, at a molecular ratio of one to at least one; and (d) Polyester compounds containing at least one radiation-curable, unsaturated double bond, and (3) a second radiation cured resin or mixture of resins which in the uncured state is a water soluble resin, a water dispersible resin or mixtures thereof and is further characterized by the presence of at least one unsaturated double bond curable upon exposure to radiation and as having a molecular weight of from 200 to 5000.

2. A magnetic recording medium of claim 1 wherein the second radiation cured resin has a molecular weight in the uncured state of from 400 to 3000.

3. A magnetic recording medium of claim 1 wherein the first radiation cured resin has a molecular weight in the uncured state of not less than 8000.

4. A magnetic recording medium of claim 1 wherein the first radiation cured resin has a molecular weight in the uncured state of not less than 8000 and the second radiation cured, water soluble resin has a molecular weight in the uncured state of from 400 to 3000.

* * * * *